US012620707B2

(12) United States Patent
Watanabe et al.

(10) Patent No.: US 12,620,707 B2
(45) Date of Patent: May 5, 2026

(54) RIS ELEMENT, ANTENNA, ANTENNA APPARATUS, COMMUNICATION APPARATUS, AND METHOD FOR CONTROLLING ANTENNA APPARATUS

(71) Applicant: NEC Corporation, Tokyo (JP)

(72) Inventors: Shingo Watanabe, Tokyo (JP); Masakazu Ono, Tokyo (JP); Kenji Wakafuji, Tokyo (JP); Kohei Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/656,680

(22) Filed: May 7, 2024

(65) Prior Publication Data

US 2024/0405429 A1 Dec. 5, 2024

(30) Foreign Application Priority Data

May 29, 2023 (JP) ................................ 2023-087711

(51) Int. Cl.
*H01Q 3/46* (2006.01)
*H01Q 15/00* (2006.01)

(52) U.S. Cl.
CPC .......... *H01Q 3/46* (2013.01); *H01Q 15/0006* (2013.01)

(58) Field of Classification Search
CPC . H05B 47/04013; H01Q 3/46; H01Q 15/0006
See application file for complete search history.

(56) References Cited

U.S. PATENT DOCUMENTS 10,490,903 B2 11/2019 Foo
10,938,105 B2 3/2021 Snyder et al.
(Continued)

FOREIGN PATENT DOCUMENTS

JP 2010-521915 A 6/2010
JP 2020-136687 A 8/2020
(Continued)

OTHER PUBLICATIONS

Marco Rossanese, et al., "Designing, Building, and Characterizing RF Switch-based Reconfigurable Intelligent Surfaces", Jul. 14, 2022, arXiv,<URL:https://arxiv.org/abs/2207.07121v1>.
(Continued)

*Primary Examiner* — Raymond R Chai
(74) *Attorney, Agent, or Firm* — Sughrue Mion, PLLC

(57) ABSTRACT

An antenna element receives a first radio wave and outputs a transmission signal, and receives a second radio wave and outputs a reception signal. A phase conversion unit applies a predetermined phase shift amount to a signal to be input and then output the signal. A switch connects the antenna element to one of the phase conversion unit and external receiver. When the first radio wave enters the antenna, the switch connects the antenna element to the phase conversion unit, and the transmission signal to which the predetermined phase shift amount has been applied is radiated from the antenna element. A third radio wave radiated from each of a plurality of RIS elements is deflected in a predetermined direction. When the second radio wave enters the antenna, the switch connects the antenna element to the external receiver, and the external receiver receives the reception signal.

8 Claims, 15 Drawing Sheets

(56) References Cited

U.S. PATENT DOCUMENTS

| | | | |
|---|---|---|---|
| 12,015,202 | B2 | 6/2024 | Bhattacharyya et al. |
| 2003/0227859 | A1* | 12/2003 | Hirai ...................... G11B 7/139 |
| 2016/0372835 | A1 | 12/2016 | Toso et al. |
| 2018/0356515 | A1 | 12/2018 | Martinez-Lorenzo |
| 2023/0144085 | A1 | 5/2023 | Dutta et al. |
| 2024/0210523 | A1 | 6/2024 | Watanabe et al. |
| 2024/0213671 | A1* | 6/2024 | Watanabe ................ H01Q 3/46 |
| 2025/0007567 | A1* | 1/2025 | Haustein ............ H04B 7/04013 |

FOREIGN PATENT DOCUMENTS

| | | |
|---|---|---|
| JP | 2021-517406 A | 7/2021 |
| JP | 2022-117980 A | 8/2022 |

OTHER PUBLICATIONS

Non-Final Office Action issued Jun. 4, 2025 in United States U.S. Appl. No. 18/539,720.

"The Institute of Electronics. Information and Communication Engineers Knowledge Base; Group 10; Chapter 8; Section 8, Phase shifters and Antennas", The institute of Electronics, Information and Communication Engineers, [retrieved on Dec. 2022], <URL https://www.ieice-hbkb.org/files/10/10gun 08hen 08.pdf>.

US Office Action for U.S. Appl. No. 18/543,034, mailed on Feb. 13, 2026.

* cited by examiner

RIS ELEMENT, ANTENNA, ANTENNA APPARATUS, COMMUNICATION APPARATUS, AND METHOD FOR CONTROLLING ANTENNA APPARATUS

INCORPORATION BY REFERENCE

This application is based upon and claims the benefit of priority from Japanese patent application No. 2023-87711, filed on May 29, 2023, the disclosure of which is incorporated herein in its entirety by reference.

TECHNICAL FIELD

The present disclosure relates to an RIS element, an antenna, an antenna apparatus, a communication apparatus, and a method for controlling an antenna apparatus.

BACKGROUND ART

With advancement of communication technology, various methods for transmitting and receiving radio signals have been proposed.

For example, Japanese Unexamined Patent Application Publication No. 2022-117980 discloses the following as a technique for estimating a location of a user terminal. A reconfigurable intelligent surface (RIS) panel reflects a pilot signal transmitted from an access point, according to a predetermined reflection pattern. Upon receiving the reflected signal, a user terminal extracts features from the signal, and estimates a location of the user terminal, based on a database including a pair of a location and one or more features.

Further, Japanese Unexamined Patent Application Publication No. 2020-136687 discloses a directional antenna for transmission in which a reflecting plate is provided near an array antenna, and proposes an antenna in which a reflecting plate is configured as an RIS reflecting plate.

Japanese Patent Application Publication No. 2021-517406 proposes a method for transmitting and receiving radio signals to and from a radio apparatus located inside a structure having a physical barrier, such as a wall or a window, through the physical barrier.

SUMMARY

Recently, beamforming of a 5th-generation (5G) base station is achieved by, for example, a configuration using a solid state power amplifier (SSPA) and a phased array antenna. However, as the communication frequency becomes high, it is assumed that more heat dissipation occurs during operation, due to an increase in the number of communication elements such as antennas and amplifiers, or an increase in integration of devices.

As a solution to such problems, it is conceivable that an antenna may be configured by a RIS unit capable of directionally controlling a reflected wave, to thereby transmit and receive radio waves. However, when an antenna for transmission and an antenna for reception configured by the RIS units are separately provided, the size of the antenna increases, and thus there is a problem, for example, that a place where the antenna is installed is limited and that the cost increases.

The present disclosure has been made in view of the above circumstances, and an example object of the present disclosure is to transmit and receive radio waves using a single antenna configured by an array of RIS elements.

In a first example aspect of the present disclosure, a Reconfigurable Intelligent metaSurface (RIS) element includes: a first antenna element configured to receive a first radio wave and output a transmission signal, and receive a second radio wave and output a reception signal; a first phase conversion unit configured to apply a predetermined phase shift amount to a signal to be input and then output the signal; and a first switch configured to connect the first antenna element to one of the first phase conversion unit and external reception means, in which when the first radio wave enters the first antenna element, the first switch connects the first antenna element to the first phase conversion unit, so that the transmission signal to which the predetermined phase shift amount has been applied by the first phase conversion unit is radiated from the first antenna element as a third radio wave, and the third radio wave radiated from each of a plurality of the first antenna elements arranged in an array is deflected in a predetermined direction in accordance with the phase shift amount applied to the transmission signal in each of a plurality of the first phase conversion units respectively connected to the plurality of the first antenna elements, and when the second radio wave enters the first antenna element, the first switch connects the first antenna element to the external reception means, so that the external reception means receives the reception signal.

In a second example aspect of the present disclosure, a method for controlling an antenna apparatus including: a radiation unit configured to radiate a transmission signal as a first radio wave; a reflection unit configured to reflect the first radio wave; an antenna in which the first radio wave reflected by the reflection unit and a second radio wave received from outside enter; and an antenna control unit configured to control an operation of the antenna, the antenna including: a plurality of Reconfigurable Intelligent meta Surface (RIS) elements arranged in an array in which the first radio wave and the second radio wave enter; and a RIS element control unit configured to control operations of the plurality of RIS elements in accordance with the control by the antenna control unit, and each of the plurality of RIS elements including: an antenna element configured to receive the first radio wave and output the transmission signal, and receive the second radio wave and output a reception signal; a phase conversion unit configured to apply a predetermined phase shift amount to a signal to be input and then output the signal in accordance with the control by the RIS element control unit; and a switch configured to connect the antenna element to one of the phase conversion unit and external reception means in accordance with the control by the RIS element control unit, in which in the method: when the first radio wave enters the antenna, the antenna element is connected to the phase conversion unit by the switch of each of the plurality of RIS elements, and the transmission signal to which the predetermined phase shift amount has been applied by the phase conversion unit is radiated from the antenna element as a third radio wave; the third radio wave radiated from each of the plurality of RIS elements is deflected in a predetermined direction in accordance with the phase shift amount applied to the transmission signal by each of the plurality of RIS elements; when the second radio wave enters the antenna, the antenna element is connected to the external reception means by the switch of each of the plurality of RIS elements; and the reception signal is received by the external reception means.

According to the present disclosure, it is possible to transmit and receive radio waves using a single antenna configured by an array of RIS elements.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
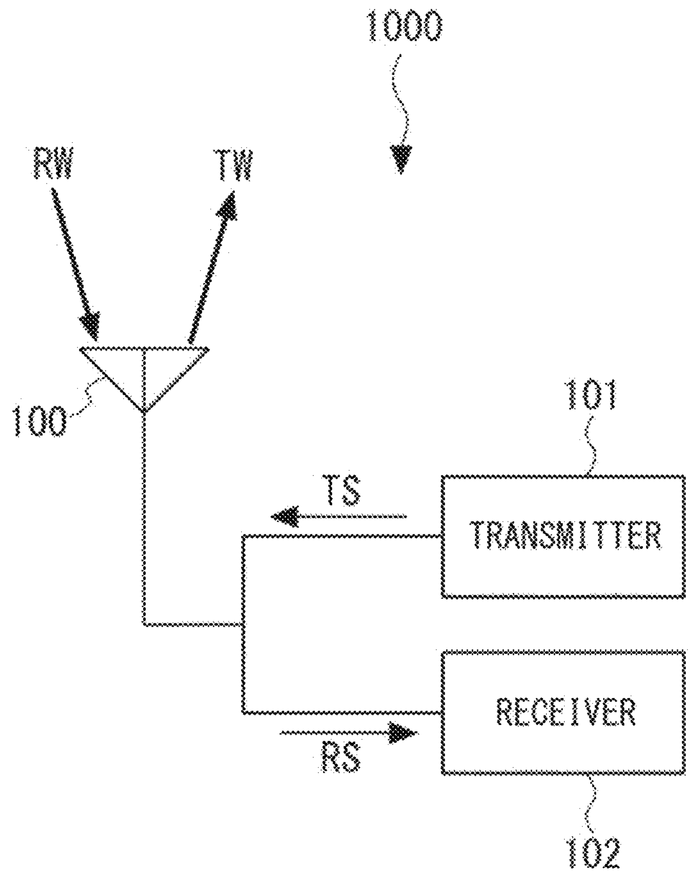
FIG. 1 is a diagram schematically showing a configuration of a communication apparatus according to a first example embodiment.

Hereinafter, example embodiments of the present disclosure will be described with reference to the drawings. In the drawings, the same element is denoted by the same reference numeral, and redundant description is omitted as necessary.

First Example Embodiment

An antenna apparatus according to a first example embodiment will be described. The antenna apparatus according to the present example embodiment is configured to transmit radio waves to another communications apparatus and receive radio waves from the other communications apparatus using a single antenna composed of a Reconfigurable Intelligent metaSurface (RIS) reflecting plate. RIS elements are arranged in the RIS reflecting plate in an array so as to control the phase shift amount applied to the radio waves input to each of the RIS elements. Thus, the RIS reflecting plate, like a phased array antenna, can deflect a radio wave to be transmitted in a desired direction. Further, the RIS reflecting plate can receive radio waves entered from a specific direction.

FIG. 1 schematically shows a configuration of a communication apparatus 1000 according to the first example embodiment. The communication apparatus 1000 includes an antenna apparatus 100, a transmitter 101, and a receiver 102.

The transmitter 101 outputs a transmission signal TS, which is an RF signal, to the antenna apparatus 100. The antenna apparatus 100 radiates the transmission signal TS as a radio wave TW to another communication apparatus or the like with which the antenna apparatus 100 communicates.

The antenna apparatus 100 receives a radio wave RW from another communication apparatus or the like. Then the antenna apparatus 100 outputs a reception signal RS, which is an RF signal, to the receiver 102. The receiver 102 performs predetermined signal processing on the reception signal RS, thereby decoding the reception signal RS.

Figure 2:
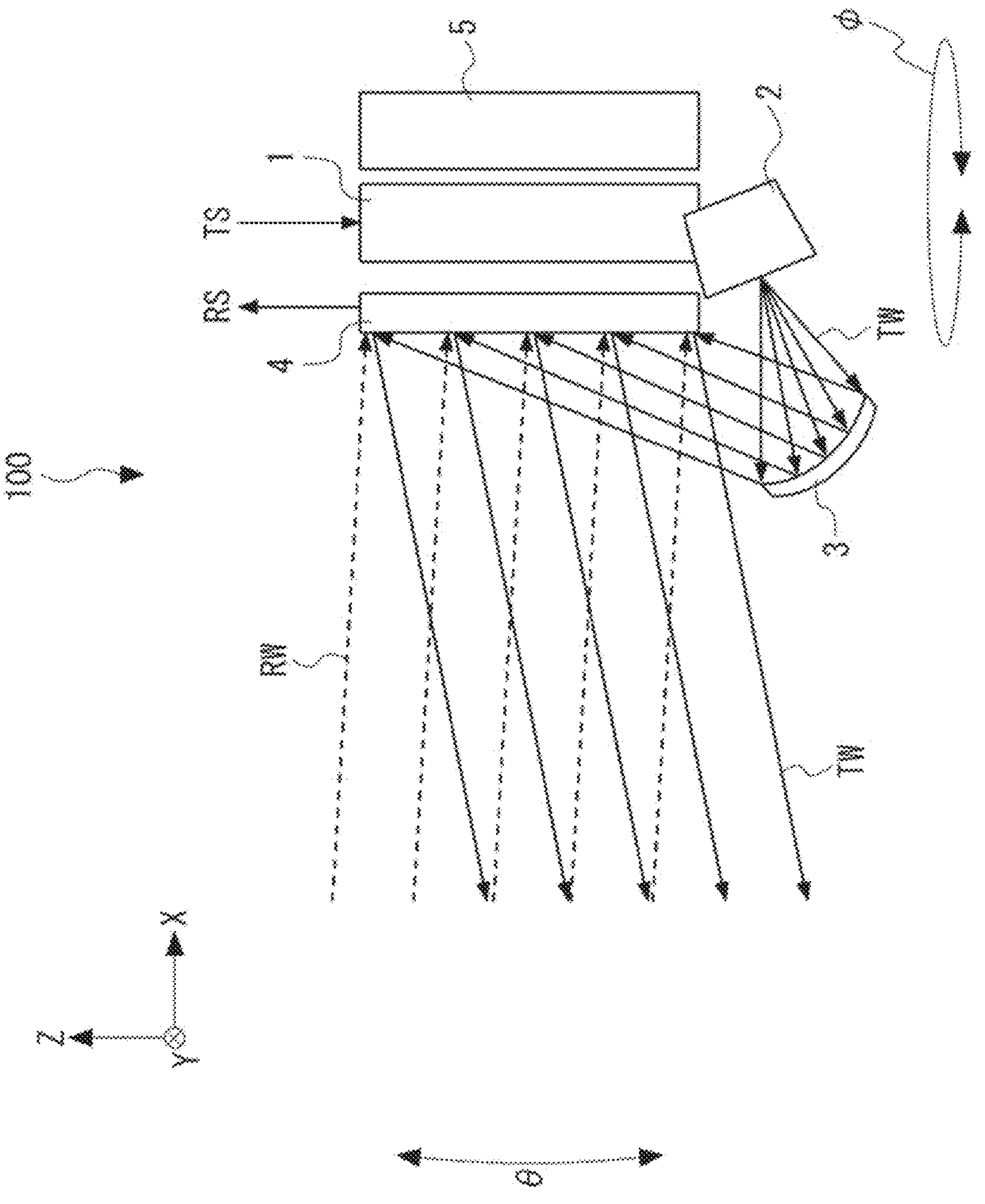
FIG. 2 is a diagram schematically showing an external configuration of an antenna apparatus according to the first example embodiment.

FIG. 2 schematically shows an external configuration of the antenna apparatus 100 according to the first example embodiment. The antenna apparatus 100 includes an amplification unit 1, a radiation unit 2, a reflection unit 3, an antenna 4, and an antenna control unit 5.

In FIG. 2, a direction toward the right of the drawing is defined as an X direction, a direction toward the top is defined as a Z direction, and a direction from the front to the back of the drawing is defined as a Y direction. A rotation direction around the Z-axis, that is, an azimuth direction of the communication apparatus 1000, is defined as a pan direction q, and a rotation direction around an axis parallel to the X-Y plane, that is, an elevation/depression angle direction of the communication apparatus 1000, is defined as a tilt direction θ.

The amplification unit 1 amplifies the input transmission signal TS and outputs the amplified transmission signal TS to the radiation unit 2. The amplification unit 1 is configured as, for example, a high-power amplifier such as a traveling-wave tube amplifier (TWTA). In the present example embodiment, by using a TWTA, it is possible to configure a transmission apparatus having a higher output than in a case of using a Solid State Power Amplifier (SSPA).

The radiation unit 2 radiates the transmission signal TS amplified by the amplification unit 1 as the radio wave TW.

The radiated radio wave TW is reflected by the reflection unit 3 and enters the antenna 4. Although the radio wave TW radiated from the radiation unit 2 is a spherical wave, due to being reflected by the reflection unit 3 having a concave shape, the radio wave TW enters the antenna 4 as a substantially planar wave.

The antenna 4 includes a Reconfigurable Intelligent meta Surface (RIS) reflecting plate. When a radio wave is radiated from the antenna 4 to another communication apparatus or the like, the antenna 4 reflects the radio wave TW entered from the reflection unit 3 as the radio wave TW in a predetermined transmission direction. The radio wave TW output from the radiation unit 2 and reflected by the reflection unit 3 to enter the antenna 4 is also referred to as a first radio wave.

Further, when the radio wave RW transmitted from another communication apparatus is received, the antenna 4 selectively receives the radio wave RW entered from a predetermined reception direction. Then the antenna 4 outputs the received signal as the reception signal RS. The radio wave RW, which has been transmitted from the other communication apparatus and which enters the antenna 4, is also referred to as a second radio wave.

The antenna control unit 5 controls transmission and reception of radio waves in the antenna 4 by providing a control signal CON1 to the antenna 4.

Figure 3:
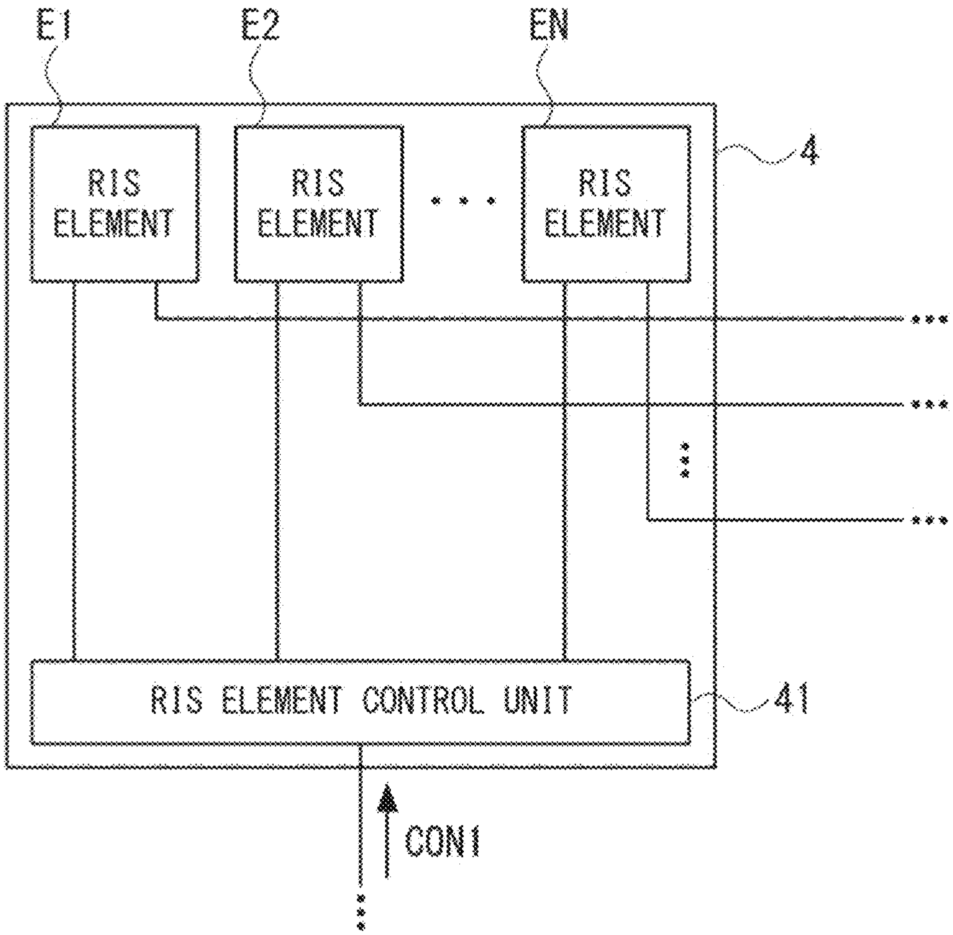
FIG. 3 is a diagram schematically showing a configuration of an antenna according to the first example embodiment.

A configuration of the antenna 4 will be described. FIG. 3 schematically shows the configuration of the antenna 4 according to the first example embodiment. The antenna 4 includes a plurality of RIS elements and a RIS element control unit 41 that controls the plurality of RIS elements.

The antenna 4 is configured by arranging the plurality of RIS elements in an array-shape on a two-dimensional plane. In the following, N is an integer of 2 or more. In FIG. 3, for the sake of simplicity, RIS elements E1 to EN are displayed side by side in one direction.

The RIS element control unit 41 controls operations of the RIS elements E1 to EN in accordance with the control signal CON1 provided from the antenna control unit 5.

Figure 4:
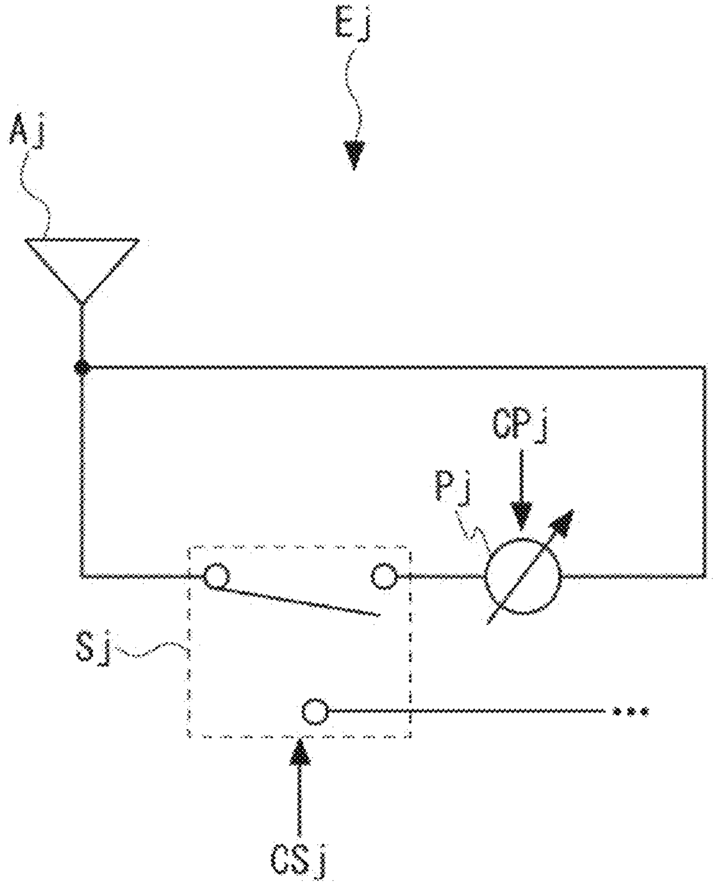
FIG. 4 is a diagram schematically showing a configuration of an RIS element.

Each of the RIS elements E1 to EN will be described. Hereinafter, an RIS element Ej will be described as a common configuration of the RIS elements E1 to EN, where j is an integer of 1 or more and N or less. FIG. 4 schematically illustrates a configuration of the RIS element Ej. The RIS element Ej includes an antenna element Aj, a phase conversion unit Pj, and a switch Sj.

The antenna element Aj is connected to a circuit including the switch Sj and the phase conversion unit Pj. In this example, the antenna element Aj is connected to one end of the phase conversion unit Pj and the receiver 102 via the switch Sj. The other end of the phase conversion unit Pj is connected to the antenna element Aj. The switch Sj switches a connection destination of the antenna element Aj between the phase conversion unit Pj and the receiver 102 in accordance with a switch control signal CSj.

The phase conversion unit Pj applies a desired phase shift amount to a signal input via the switch Sj in accordance with a phase shift amount control signal CPj. The phase conversion unit Pj outputs the signal to which the desired phase shift amount has been applied to the antenna element Aj.

The phase conversion unit Pj is configured as a variable phase conversion unit capable of continuously changing the phase shift amount being applied to a reception signal RSj in accordance with the phase shift amount control signal CPj.

The above description has been given in accordance with the assumption that the phase shift amount is applied by the transmission signal passing through the phase conversion unit. However, the phase conversion unit may be configured so that the transmission signal to which the phase shift amount has been applied by the phase conversion unit returns to the antenna element Aj following the same path as the path along which the transmission signal is input from the antenna element Aj to the phase conversion unit Pj via the switch Sj.

As described, for example, in Marco Rossanese, et al., "Designing, Building, and Characterizing RF Switch-based Reconfigurable Intelligent Surfaces", 14 Jul. 2022, arXiv, the phase conversion unit Pj may be configured by arranging a plurality of lines having different line lengths and open ends in parallel.

Figure 5:
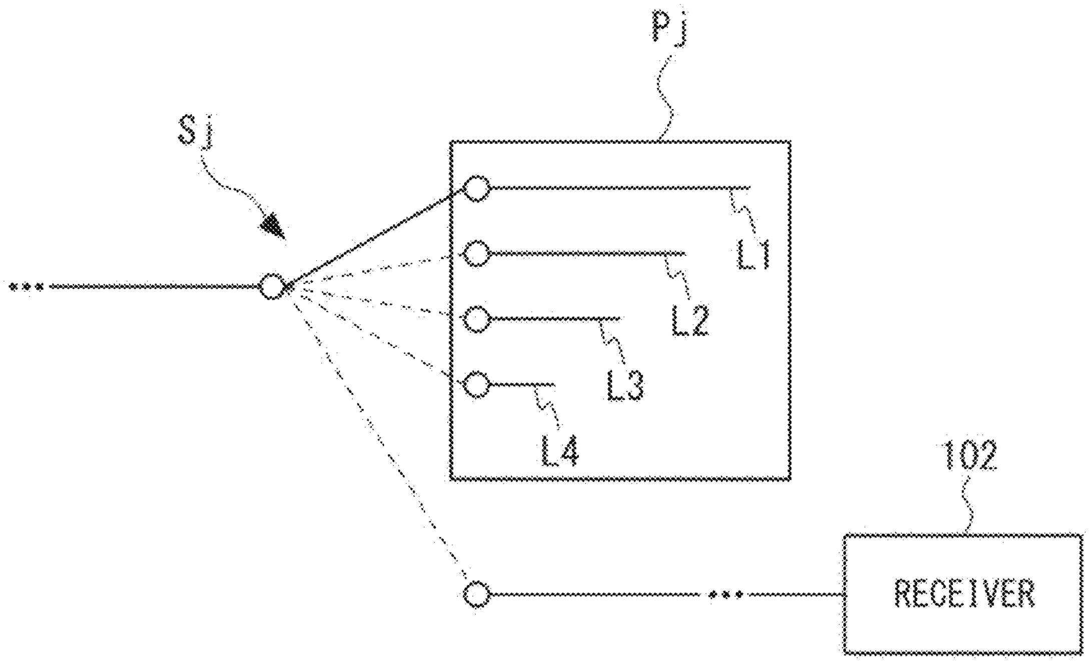
FIG. 5 is a diagram schematically showing an example of a configuration of a phase conversion unit.

FIG. 5 schematically shows an example of a configuration of the phase conversion unit Pj. In FIG. 5, the phase conversion unit Pj includes lines L1 to L4 having line lengths different from each other. One ends of the lines L1 to L4 can be connected by the switch Sj. The other ends of the lines L1 to L4 are opened.

A signal input to the phase conversion unit Pj via the switch Sj propagates through one of the lines L1 to L4 and is reflected at the open end thereof, whereby it is output to the antenna element Aj. At this time, the amount of delay, that is, the phase shift amount, applied to the signal output to the antenna element Aj can be adjusted by appropriately selecting a line through which the signal propagates from among the lines L1 to L4 to thereby adjust the line length through which the signal propagates.

The above description has been given in accordance with the assumption that, as shown in FIG. 5, four lines having line lengths different from each other are provided in order to make the description simple. However, it is needless to say that any number of a plurality of lines, that is, two, three, or five or more lines may be provided. Further, the number of lines and the line lengths of phase conversion units P1 to PN of the RIS elements E1 to EN may be similar to each other or may be designed independently of each other depending on the intended use.

Figure 6:
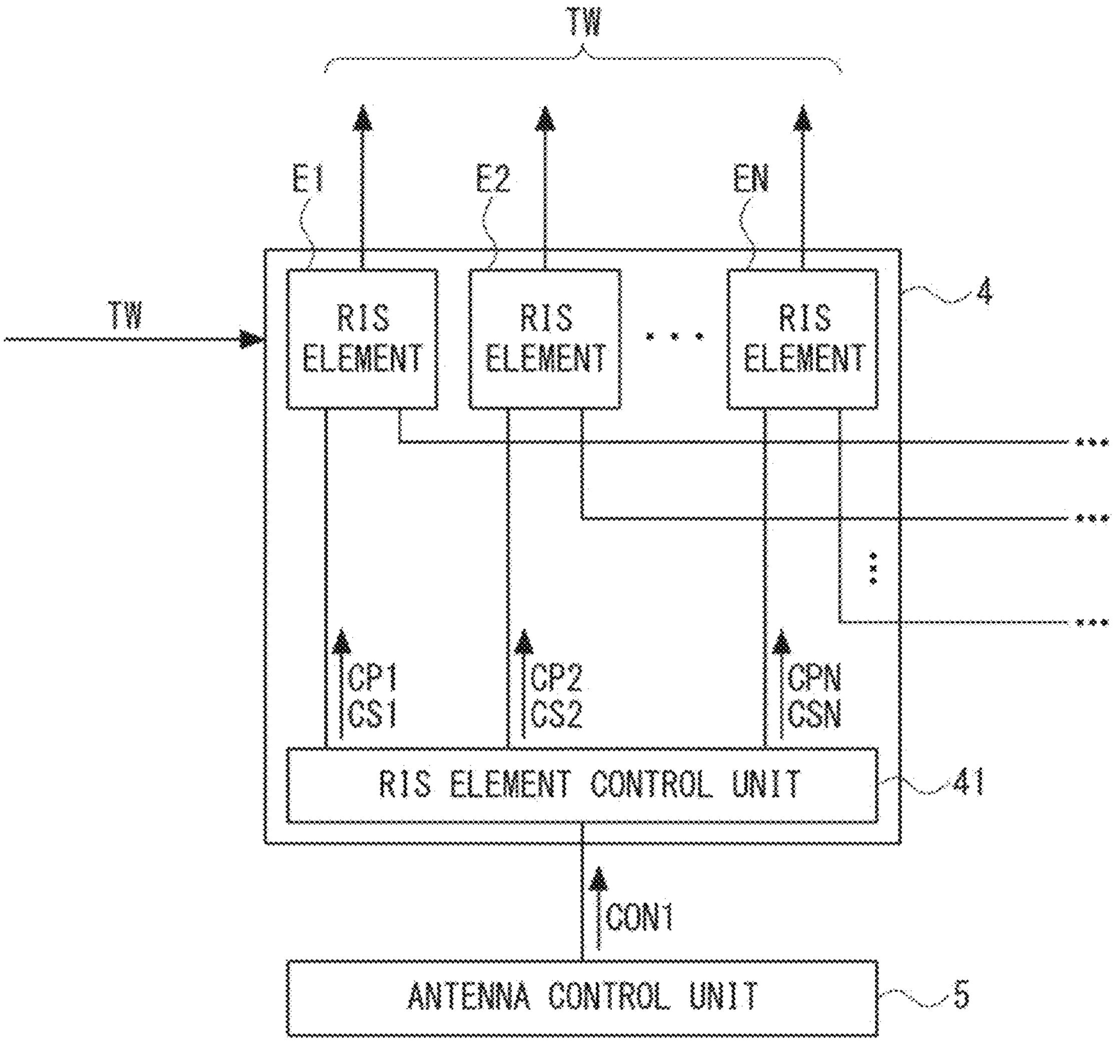
FIG. 6 is a diagram schematically showing an antenna when transmission is performed.
Figure 7:
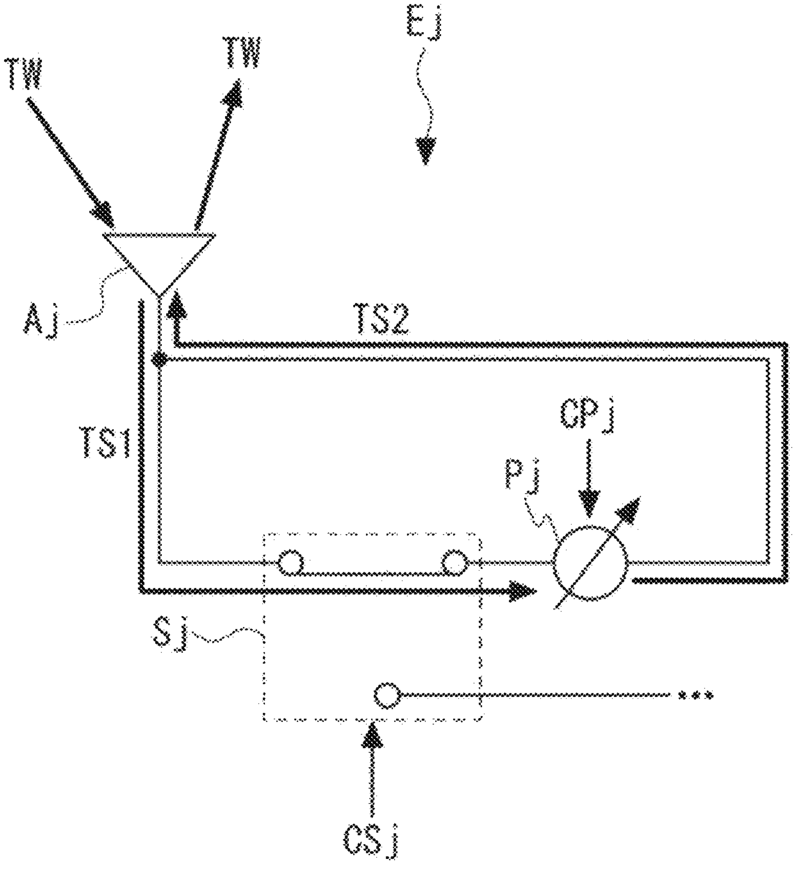
FIG. 7 is a diagram schematically showing an RIS element when transmission is performed.

A case in which transmission is performed by the antenna apparatus 100 will be described. FIG. 6 schematically shows the antenna 4 when transmission is performed. FIG. 7 schematically shows the RIS element Ej when transmission is performed. When transmission is performed by the antenna 4, the radio waves TW enter the RIS elements E1 to EN from the reflection unit 3.

At this time, each of the RIS elements E1 to EN, that is, the switch Sj of the RIS element Ej, connects the antenna element Aj to the phase conversion unit Pj in accordance with the switch control signal CSj. By doing so, the radio wave TW received by the antenna element Aj is input to the phase conversion unit Pj via the switch Sj as a transmission signal TS1.

The phase conversion unit Pj applies a desired phase shift amount to the transmission signal TS1 in accordance with the phase shift amount control signal CPj. The phase conversion unit Pj outputs a transmission signal TS2 to which the desired phase shift amount has been applied to the antenna element Aj.

The transmission signal TS input to the antenna element Aj is radiated from the antenna element Aj as the radio wave TW.

At the time of transmission, the RIS element control unit 41 controls the phase shift amount applied to the transmission signal TS1 by each of the phase conversion units P1 to PN using phase shift amount control signals CPI to CPN, thereby enabling the radio waves TW, which have been radiated from the RIS elements E1 to EN and multiplexed, to be changed in a desired direction. The multiplexed radio wave TW radiated from the antenna 4 to another communication apparatus or the like is also referred to as a third radio wave.

Figure 8:
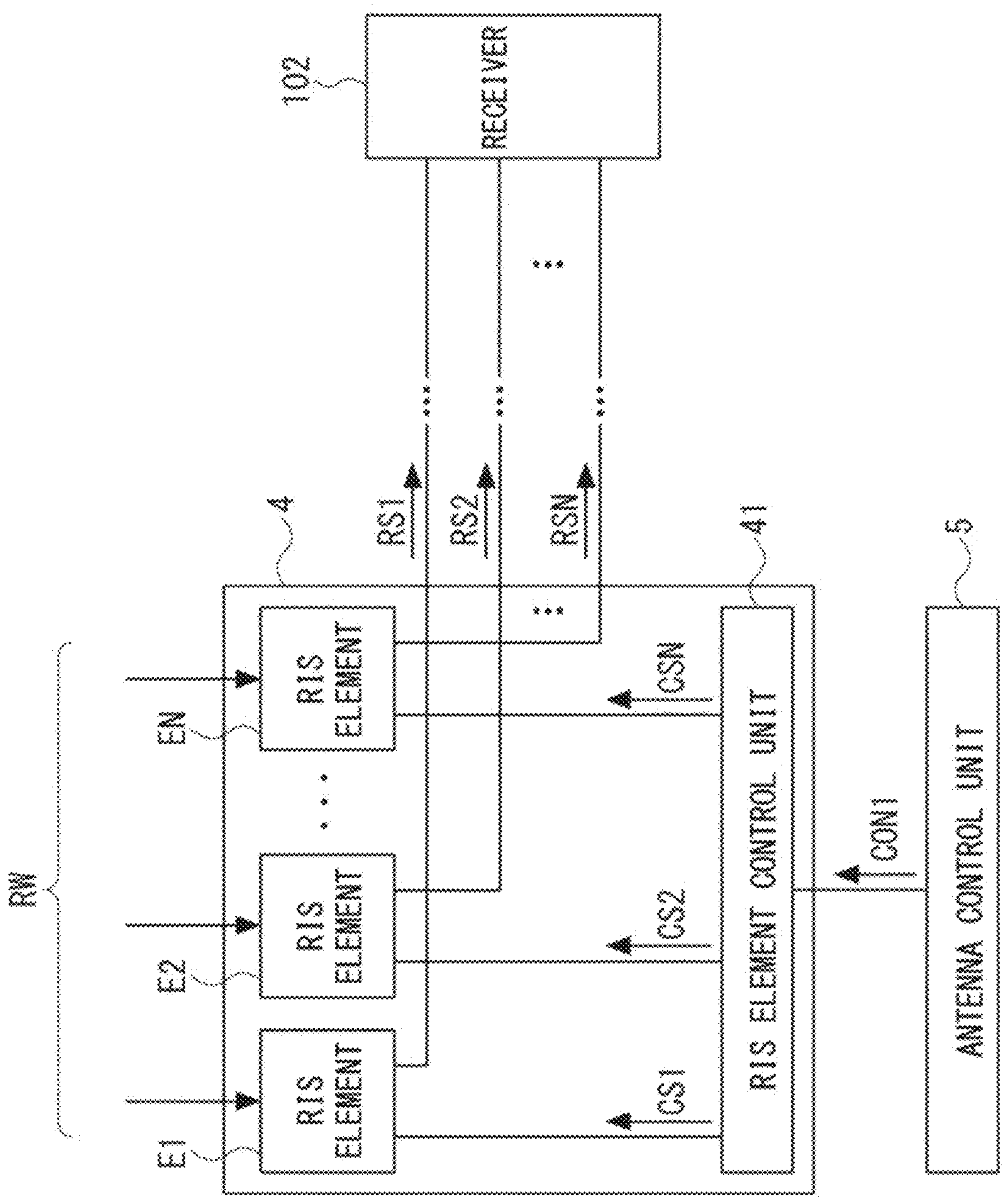
FIG. 8 is a diagram schematically showing an antenna when reception is performed.
Figure 9:
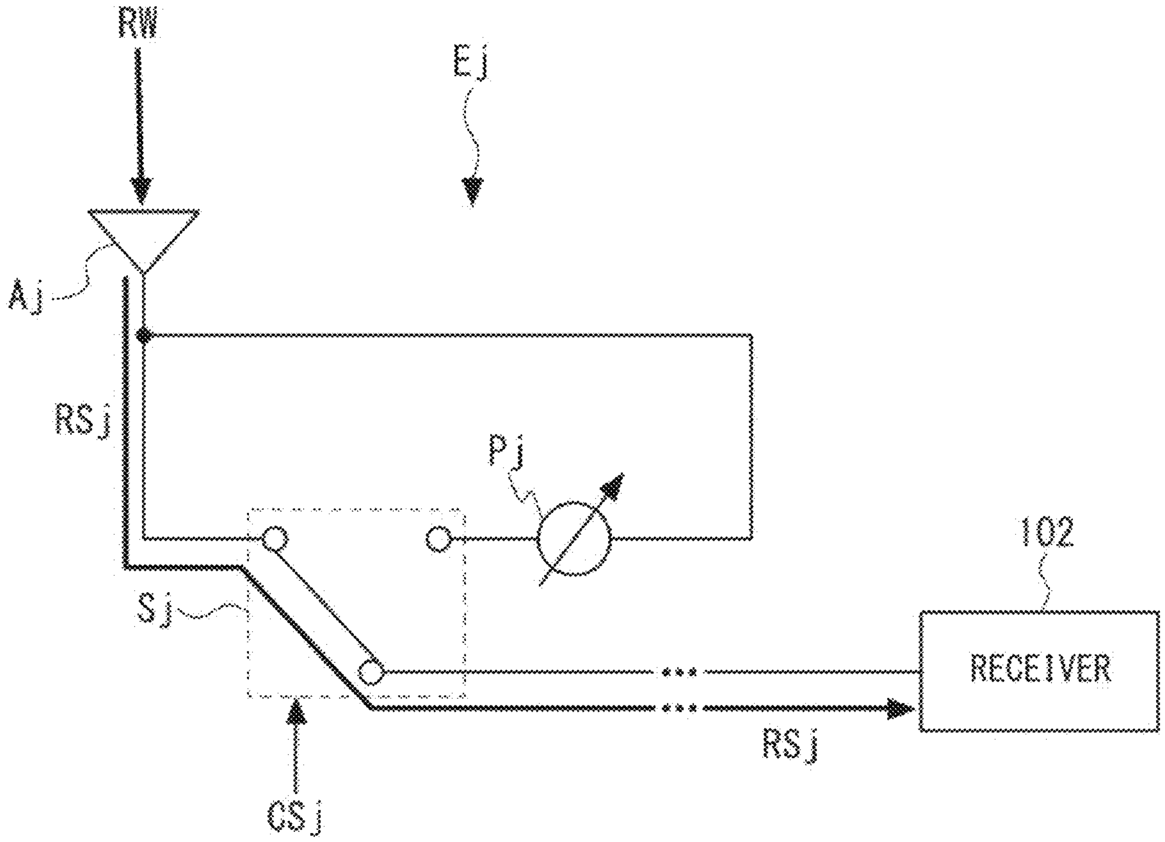
FIG. 9 is a diagram schematically showing a RIS element when reception is performed.

Next, a case in which reception is performed by the antenna apparatus 100 will be described. FIG. 8 schematically shows the antenna 4 when reception is performed. FIG. 9 schematically shows the RIS element Ej when reception is performed. When reception is performed by the antenna apparatus 100, each of the RIS elements E1 to EN, that is, the switch Sj of the RIS element Ej, connects the antenna element Aj to the receiver 102. By doing so, the radio wave RW transmitted from another communication apparatus or the like is received by the antenna element Aj, and output to the receiver 102 as the reception signal RSj via the switch Sj.

The receiver 102 performs predetermined signal processing on reception signals RS1 to RSN respectively received from the RIS elements E1 to EN. By doing so, the receiver 102 can receive the reception signal RS obtained by multiplexing the reception signals RS1 to RSN.

Figure 10:
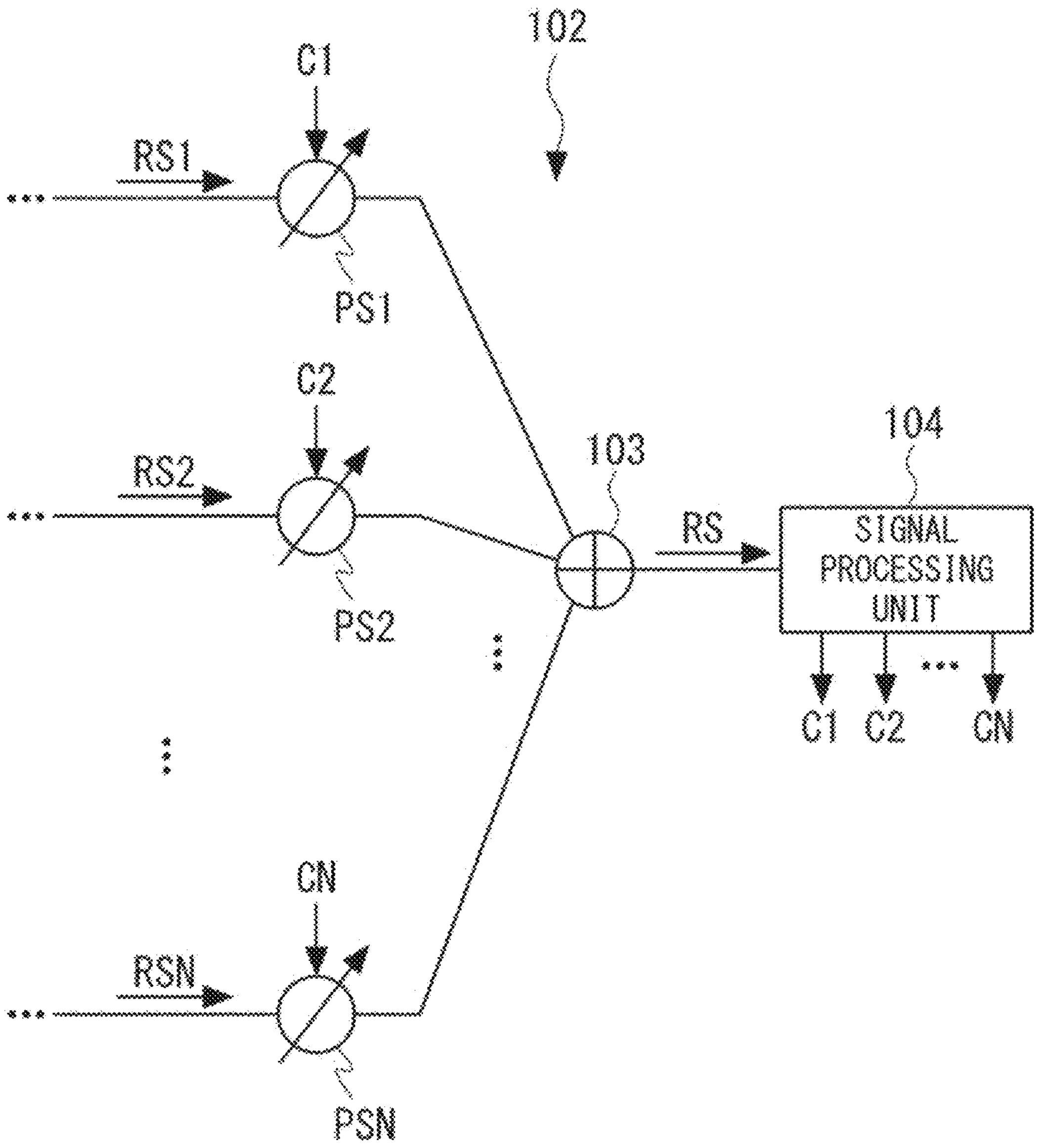
FIG. 10 is a diagram showing an example of a configuration of a receiver.

An example of reception processing performed in the receiver 102 will be described. FIG. 10 shows an example of a configuration of the receiver 102. The receiver 102 includes analog phase shifters PS1 to PSN. The reception signals RS1 to RSN are input to the analog phase shifters PS1 to PSN, respectively. The analog phase shifters PS1 to PSN respectively apply desired phase shift amounts to the reception signals RS1 to RSN, thereby matching the phases of the reception signals RS1 to RSN with each other. Then the analog phase shifters PS1 to PSN output the reception signals RS1 to RSN the phases of which have been made to match each other to an adder 103.

The adder 103 multiplexes the reception signals RS1 to RSN the phases of which have been made to match each other, thereby outputting the reception signal RS, which is an RF signal, to a signal processing unit 104. By doing so, the signal processing unit 104 receives the reception signal RS. Then the signal processing unit 104 performs predetermined signal processing on the reception signal RS. The signal processing unit 104 can, for example, perform various types of processing corresponding to a modulation scheme of the reception signal RS, and the details thereof will be omitted.

In the present configuration, the analog phase shifters PS1 to PSN may be configured as variable phase conversion units that can continuously change the phase shift amounts respectively applied to the reception signals RS1 to RSN. In this case, for example, the signal processing unit 104 can adjust the phase shift amounts applied to the reception signals RS1 to RSN by respectively applying phase shift amount control signals C1 to CN to the analog phase shifters PS1 to PSN. Further, the analog phase shifters PS1 to PSN may adjust amplitudes of the reception signals RS1 to RSN to be output.

In FIG. 10, an example of a case in which phase matching of reception signals is achieved using analog phase shifters has been described. However, the configuration of the receiver 102 is not limited thereto. For example, it is needless to say that the receiver 102 may be configured to perform analog-to-digital conversion on each of the reception signals RS1 to RSN and then receive the reception signal RS by digital signal processing.

As described above, according to the present configuration, it is possible to transmit and receive radio waves using the single antenna apparatus 100 configured by an array of RIS elements. Thus, it is possible to reduce the size of the antenna apparatus.

Further, by reducing the size of the antenna apparatus 100, it is possible to reduce the manufacturing cost of the antenna apparatus 100 and to easily install the antenna apparatus 100 in a relatively small place.

Second Example Embodiment

In the first example embodiment, a description has been given in accordance with the assumption that transmission and reception are performed using the single antenna apparatus 100. However, the TWTA configuring the amplification unit 1 is constantly performing an amplification operation. Therefore, even when a communication apparatus is performing reception, a noise signal is amplified even though no transmission signal is input. The amplified noise signal is radiated from the radiation unit 2 to the antenna 4 via the reflection unit 3. Therefore, the noise signal may be superimposed on the reception signal RS.

Figure 11:
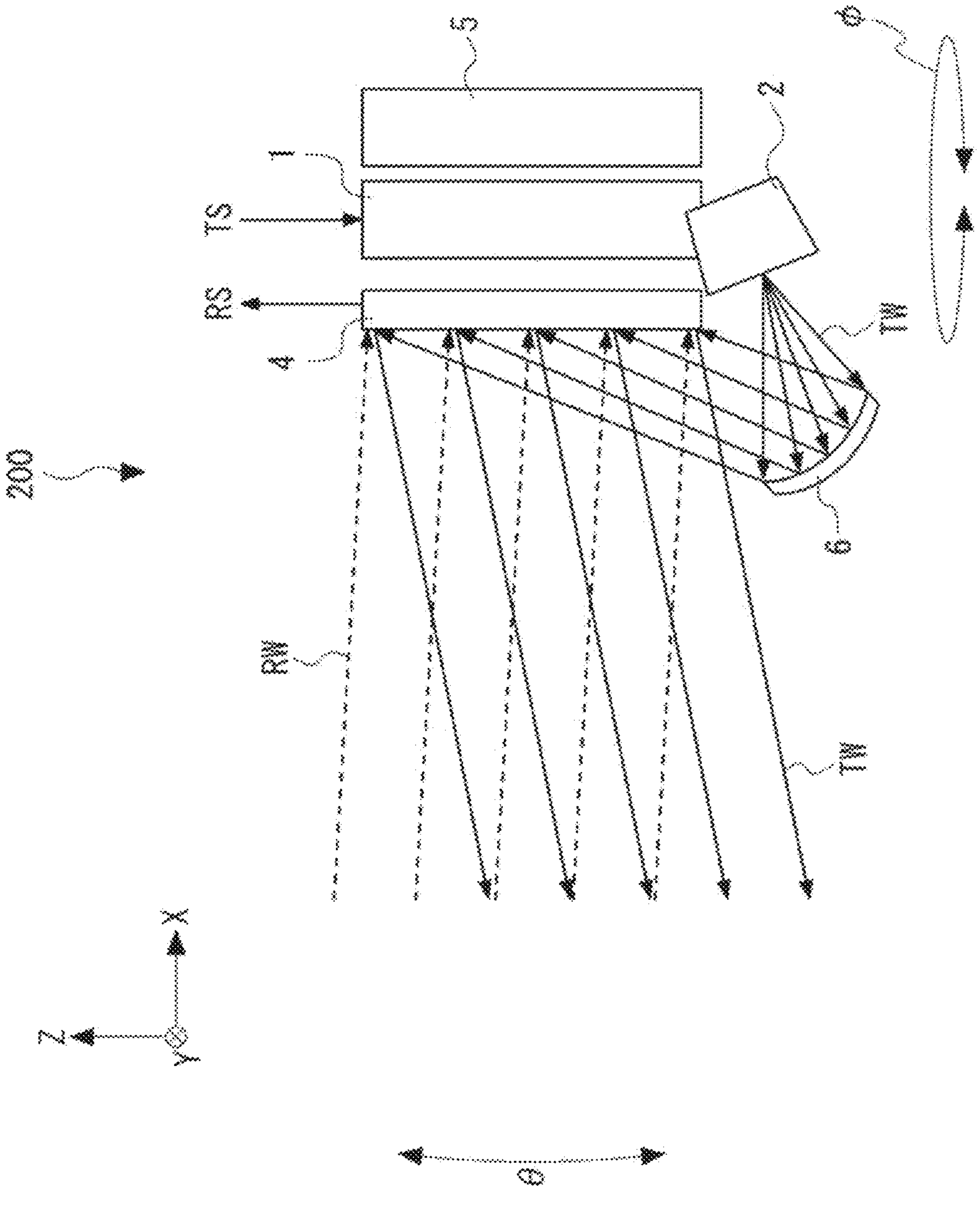
FIG. 11 is a diagram schematically showing a configuration of an antenna apparatus according to a second example embodiment.

In contrast, an antenna apparatus according to the present example embodiment is configured to prevent a noise signal from being superimposed on a reception signal. FIG. 11 schematically shows a configuration of an antenna apparatus 200 according to a second example embodiment. The antenna apparatus 200 has a configuration in which the reflection unit 3 of the antenna apparatus 100 is replaced with a reflection unit 6.

The reflection unit 6 includes a RIS reflecting plate that reflects the radio wave TW radiated from the radiation unit 2 to the antenna 4.

Figure 12:
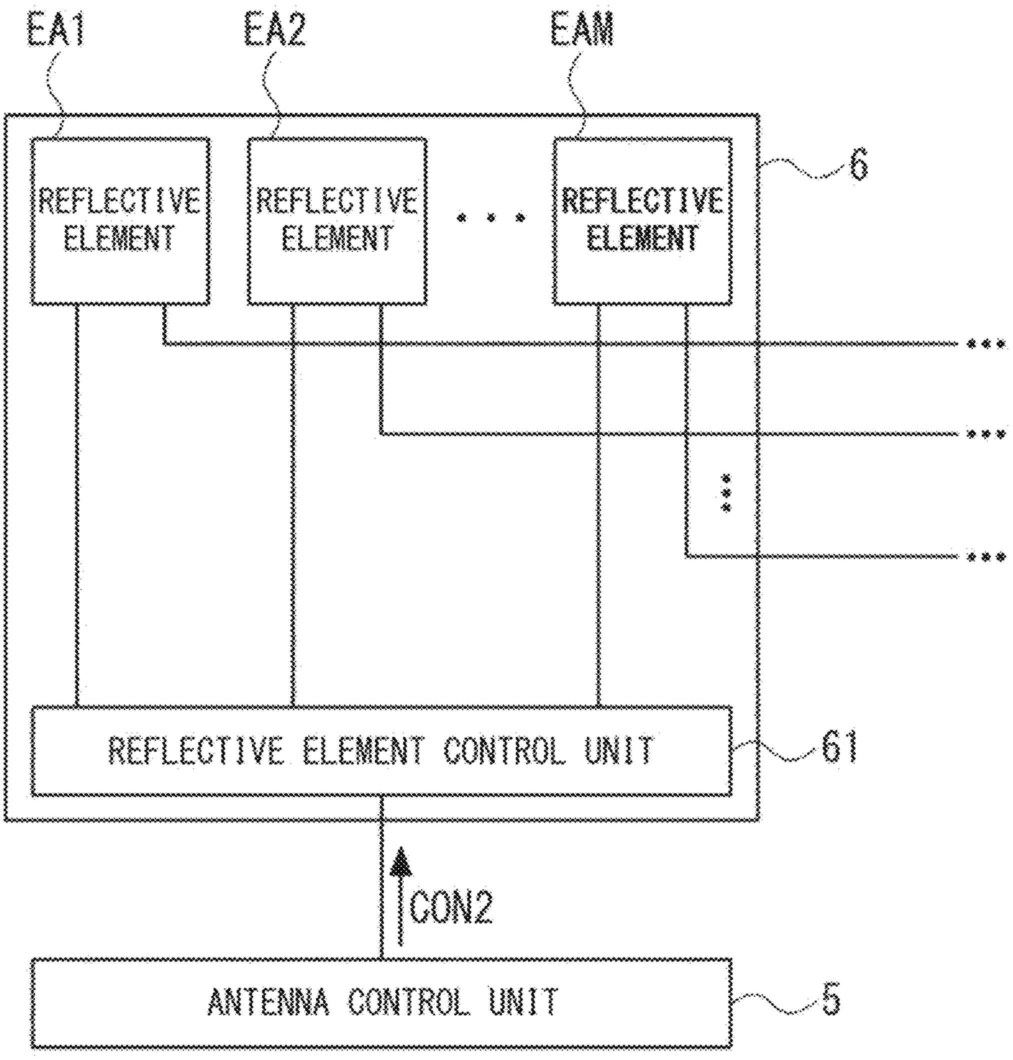
FIG. 12 is a diagram schematically showing a configuration of a reflection unit.

FIG. 12 schematically shows a configuration of the reflection unit 6. The reflection unit 6 includes a plurality of reflective elements configured as RIS elements and a reflective element control unit 61 that controls the plurality of reflective elements.

The reflection unit 6 is configured by arranging the plurality of reflective elements in an array-shape on a two-dimensional plane. In the following, M is an integer equal to or greater than 2. In FIG. 12, for the sake of simplicity, reflective elements EA1 to EAM are displayed side by side in one direction. The reflective element control unit 61 controls operations of the reflective elements EA1 to EAM in accordance with a control signal CON2 provided from the antenna control unit 5.

Figure 13:
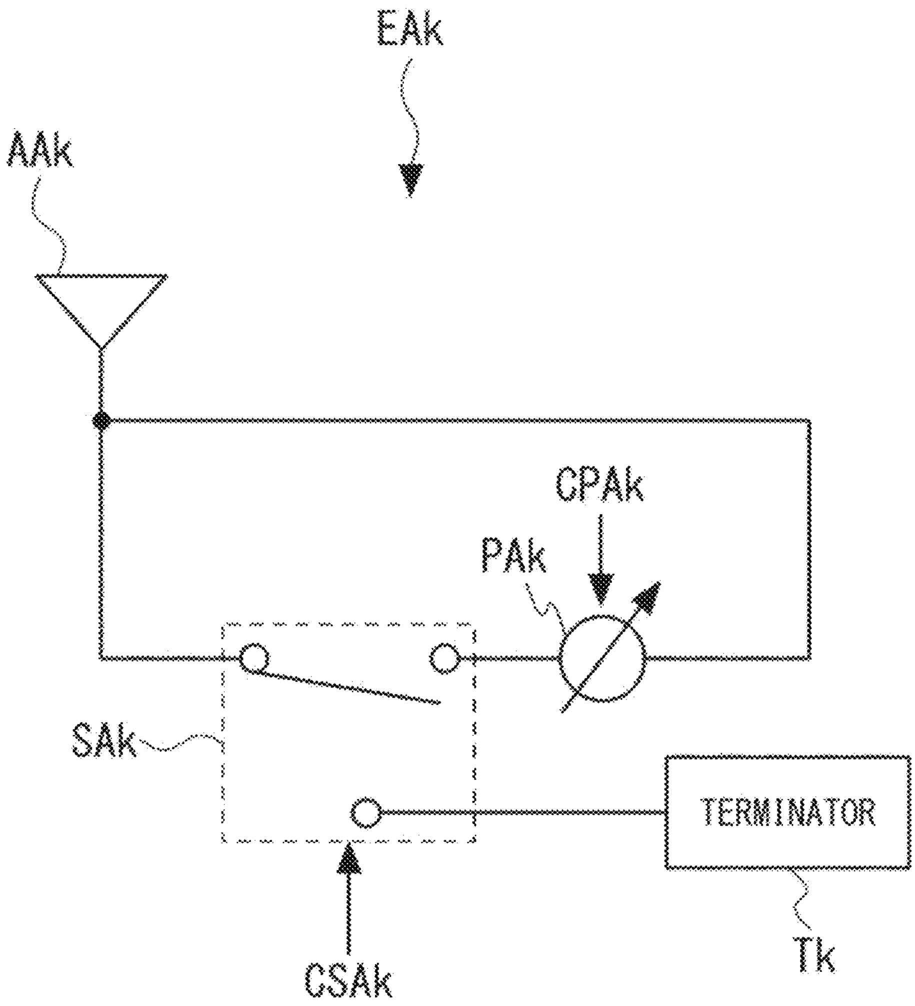
FIG. 13 is a diagram schematically showing a configuration of a reflective element.

Each of the reflective elements EA1 to EAM will be described. Hereinafter, a reflective element EAk will be described as a common configuration of the reflective elements EA1 to EAM, where k is an integer of 1 or more and M or less. FIG. 13 schematically illustrates a configuration of the reflective element EAk. The reflective element EAk includes an antenna element AAk, a phase conversion unit PAK, a switch SAk, and a terminator Tk.

The antenna element AAk is connected to a circuit into which the switch SAK and the phase conversion unit PAK are inserted. That is, the antenna element AAk is connected to one end of the phase conversion unit PAK via the switch SAk. The other end of the phase conversion unit PAK is connected to the antenna element AAk. The switch SAk switches a connection destination of the antenna element AAk between the phase conversion unit PAK and the terminator Tk in accordance with a switch control signal CSAK.

The operation of the reflection unit 6 when transmission is performed by the antenna apparatus 200 is similar to the operation performed when the antenna 4 of the antenna apparatus 100 performs transmission. At this time, the switch SAK connects the antenna element AAk to the phase conversion unit PAK. Therefore, the radio wave TW radiated from the radiation unit 2 is received by the antenna element AAk, whereby a transmission signal is input to the phase conversion unit PAK. The phase conversion unit PAK applies a desired phase shift amount to the transmission signal in accordance with a phase shift amount control signal CPAk. Then the phase conversion unit PAK outputs the transmission signal to which the desired phase shift amount has been applied to the antenna element AAk.

It is needless to say that the phase shift amounts applied by phase conversion units PA1 to PAM of the respective reflective elements EA1 to EAM to the transmission signal can be appropriately designed in accordance with a shape of the reflection unit 6 and a positional relationship between the reflection unit 6 and the antenna 4. Thus, the radio wave TW radiated from the radiation unit 2 is reflected toward the antenna 4 by the reflection unit 6.

Figure 14:
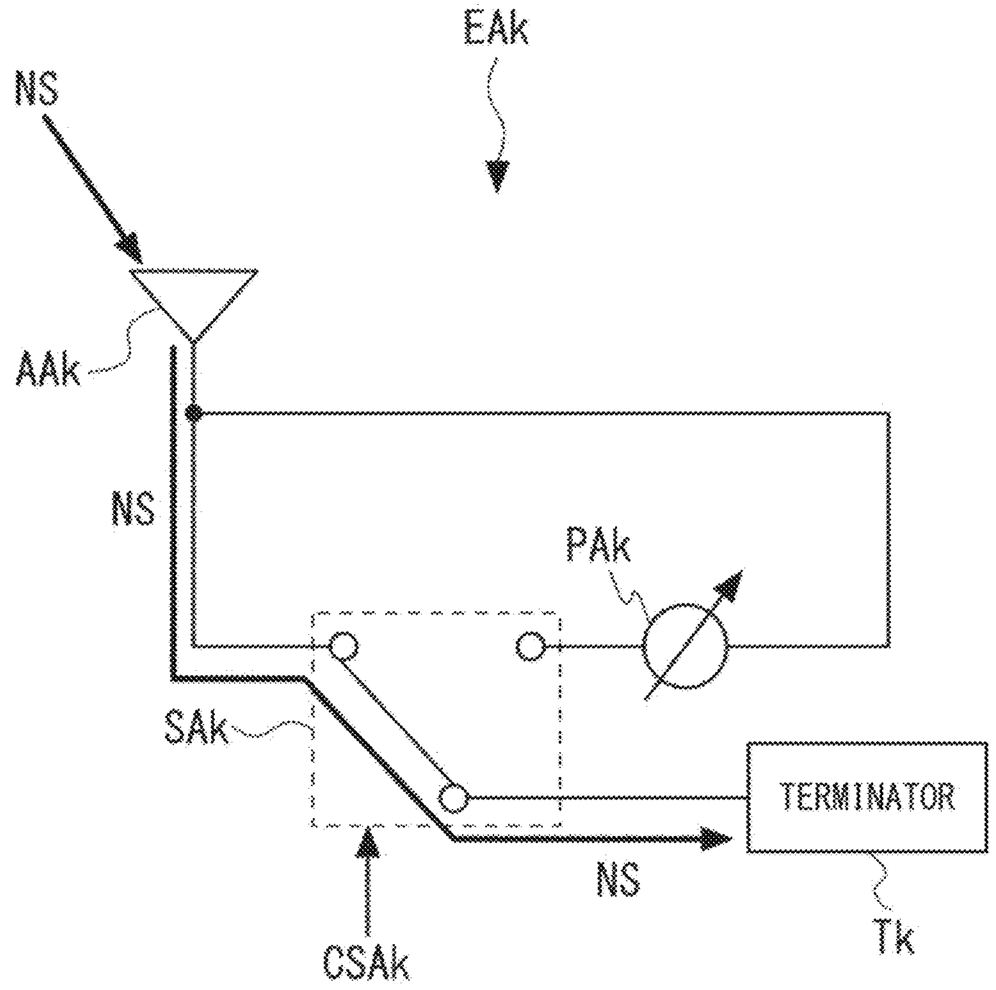
FIG. 14 is a diagram showing a reflection unit when reception is performed.

A case in which reception is performed by the antenna apparatus 200 will be described. FIG. 14 shows the reflection unit 6 when reception is performed by the antenna apparatus 200. When reception is performed by the antenna apparatus 200, the switch SAK connects the antenna element AAk to the terminator Tk. Therefore, the antenna element AAk receives a radio wave NW caused by a noise signal NS radiated from the radiation unit 2. The radio wave NW received by the antenna element AAk is input to the terminator Tk as the noise signal NS. Therefore, since the noise signal NS is terminated by the terminator Tk, the noise signal NS does not return to the antenna element AAk. As a result, radio waves caused by the noise signal can be prevented from entering the antenna 4.

Third Example Embodiment

An antenna apparatus according to a third example embodiment will be described. The antenna apparatus according to the present example embodiment is configured to reduce, even when the noise signal described in the second example embodiment enters the antenna 4, the influence of the noise signal. Since the antenna apparatus according to the third example embodiment is similar to that according to the first example embodiment except for the operations performed in the receiver 102, redundant descriptions thereof will be omitted.

In the present example embodiment, the receiver 102 controls the amplitude and the phase of each of the reception signals RS1 to RSN, thereby reducing the influence of the noise signal superimposed on the reception signal.

Figure 15:
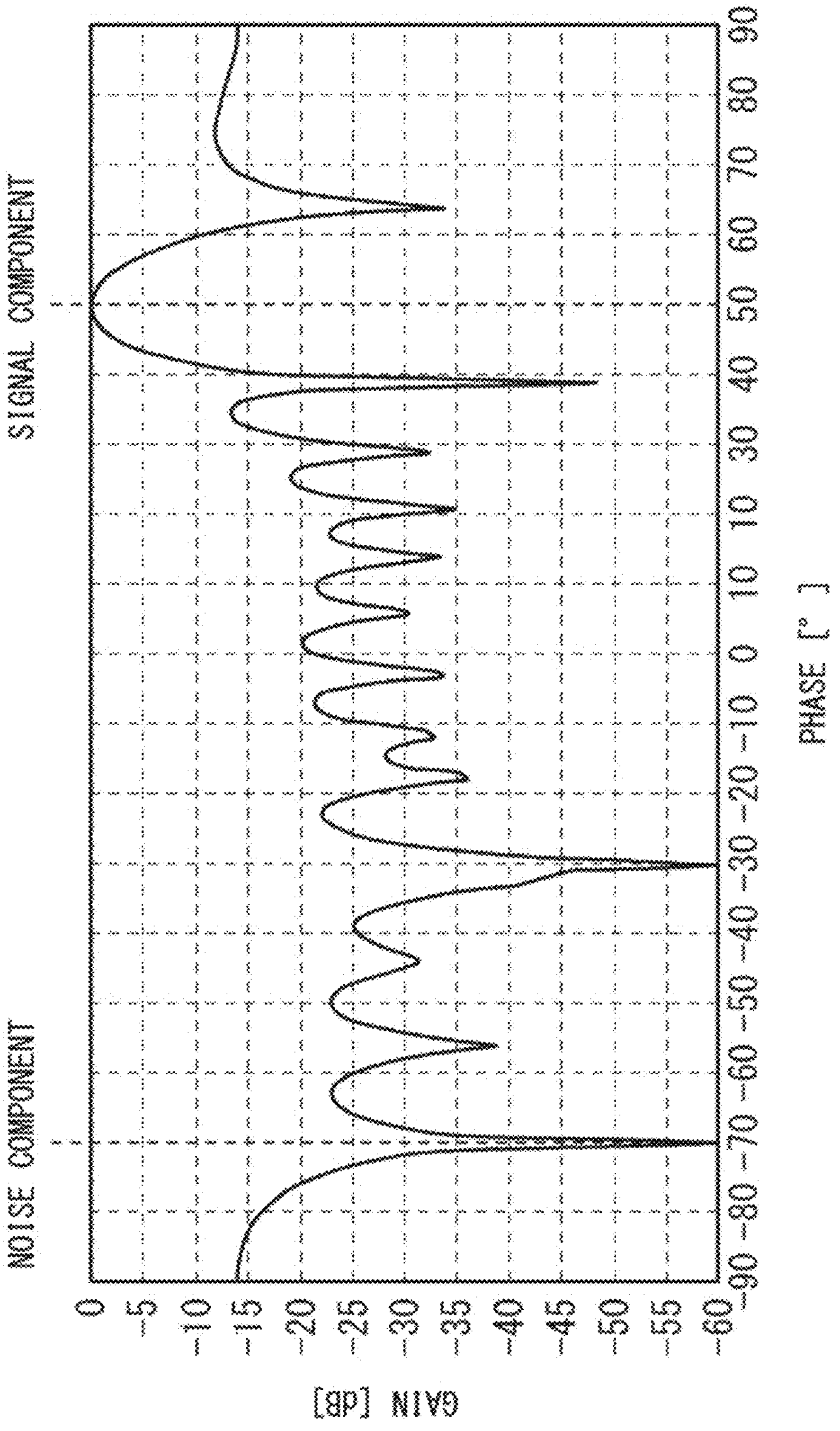
FIG. 15 is a diagram showing a direction dependence of a reception sensitivity when the influence of a noise signal is reduced by controlling the amplitude and the phase of a reception signal in a receiver.

FIG. 15 shows a direction dependence of a reception sensitivity when the influence of a noise signals is reduced by controlling the amplitude and the phase of each of the reception signals RS1 to RSN in the receiver 102. FIG. 15 shows, as an example, the reception sensitivity of the antenna apparatus 100 in a pan direction when a tilt direction θ is fixed. Further, a normal direction of the main surface of the array of the RIS elements E1 to EN of the antenna 4 is defined as an azimuthal reference position, that is, $\varphi=0°$. Further, in FIG. 15, a pan direction in a clockwise direction from the reference position is defined as positive ($\varphi>0$), and a pan direction q in a counterclockwise direction is defined as negative ($\varphi<0$).

In FIG. 15, the noise signal has entered the antenna 4 from the pan direction of −70°, and the reception signal has entered the antenna 4 from the pan direction of 50°. In this state, the signal processing unit 104 controls the analog phase shifters PS1 to PSN in the receiver 102, whereby the amplitude and the phase of each of the reception signals RS1 to RSN can be controlled so that the degree of sensitivity of the noise signal becomes a degree of sensitivity by which the reception signal can be received while reducing the degree of sensitivity of the noise signal.

Note that, like in the case of the first example embodiment, the amplitude and the phase of each of the reception signals RS1 to RSN can be appropriately adjusted by digital signal processing.

At this time, it is sufficient that the degree of sensitivity of a noise signal be reduced to a degree of sensitivity which allows the reception signal RS to be suitably received. For example, it is sufficient that the degree of sensitivity of a noise signal be reduced to a degree smaller than that by which the reception signal RS can be suitably received. Further, it is desirable that the degree of sensitivity of a noise signal be reduced to the minimum degree of sensitivity that can be achieved by controlling the amplitude and the phase of each of the reception signals RS1 to RSN.

At this time, the degree of sensitivity of the reception signal may be any degree of sensitivity by which the reception signal can be suitably received. For example, the degree of sensitivity of the reception signal may be any degree of sensitivity greater than that by which the reception signal can be suitably received. Further, it is desirable that the degree of sensitivity of the reception signal RS be the maximum degree of sensitivity that can be achieved by controlling the amplitude and the phase of each of the reception signals RS1 to RSN.

As described above, according to the present configuration, even when a noise signal reaches the antenna 4 from the radiation unit 2 via the reflection unit 3, the influence of the noise signal superimposed on the reception signal can be reduced by signal processing performed in the receiver 102.

Other Example Embodiments

Note that the present disclosure is not limited to the above-described example embodiments and may be changed as appropriate without departing from the scope and spirit of the present disclosure. For example, the reduction of a noise signal performed by the reflection unit 6 described in the second example embodiment may be combined with the reduction of a noise signal by the signal processing performed in the receiver 102 described in the third example embodiment. In this case, the influence of the noise signal at the time of reception can be more reliably reduced.

The configuration of the receiver 102 is not limited to being the configuration described above, and can be appropriately set to any other configuration in which the operations of the receiver described in the above example embodiments can be implemented.

The configuration of the phase conversion unit is not limited to being the configuration described above, and can be set to any kind of configuration in which a desired phase shift amount can be applied to a transmission signal.

The first to the third example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A Reconfigurable Intelligent metaSurface (RIS) element comprising:
- a first antenna element configured to receive a first radio wave and output a transmission signal, and receive a second radio wave and output a reception signal;
- a first phase conversion unit configured to apply a predetermined phase shift amount to a signal to be input and then output the signal; and
- a first switch configured to connect the first antenna element to one of the first phase conversion unit and external receiver, wherein when the first radio wave enters the first antenna element, the first switch connects the first antenna element to the first phase conversion unit, so that the transmission signal to which the predetermined phase shift amount has been applied by the first phase conversion unit is radiated from the first antenna element as a third radio wave, and the third radio wave radiated from each of a plurality of the first antenna elements arranged in an array is deflected in a predetermined direction in accordance with the phase shift amount applied to the transmission signal in each of a plurality of the first phase conversion units respectively connected to the plurality of the first antenna elements, and when the second radio wave enters the first antenna element, the first switch connects the first antenna element to the external receiver, so that the external receiver receives the reception signal.

2. An antenna comprising:

a plurality of the RIS elements according to claim 1 arranged in an array; and a RIS element control unit configured to control operations of the plurality of the RIS elements, wherein in each of the plurality of the RIS elements, the first phase conversion unit applies the predetermined phase shift amount to the signal to be input and then outputs the signal in accordance with the control by the RIS element control unit, and the first switch connects the first antenna element to one of the first phase conversion unit and the external receiver in accordance with the control by the RIS element control unit.

3. An antenna apparatus comprising:

a radiation unit configured to radiate a transmission signal as a first radio wave;

a reflection unit configured to reflect the first radio wave;

the antenna according to claim 2 in which the first radio wave reflected by the reflection unit and a second radio wave received from outside enter; and an antenna control unit configured to control an operation of the antenna, wherein the RIS element control unit controls the first phase conversion unit and the first switch in accordance with the control by the antenna control unit.

4. The antenna apparatus according to claim 3, wherein the first phase conversion unit comprises a plurality of lines having line lengths different from each other, one end of each of the plurality of lines being connected to the first switch, and an other end of each of the plurality of lines being an open end which reflects the transmission signal, and the first switch selects a line connected to the first switch from among the plurality of lines in accordance with the control by the RIS element control unit, thereby enabling a phase shift amount applied to the transmission signal to be changed.

5. The antenna apparatus according to claim 3, wherein the reflection unit is configured as a reflecting plate composed of reflective elements arranged in an array, the reflective elements being RIS elements in which the first radio waves enter, each of the reflective elements comprises:

a second antenna element configured to receive the first radio wave and output the transmission signal;

a second phase conversion unit configured to apply a predetermined phase shift amount to the transmission signal and then output the transmission signal to the second antenna element;

a terminator configured to terminate a signal to be input; and a second switch configured to connect the second antenna element to the second phase conversion unit when the first radio wave enters the antenna, and connect the second antenna element to the terminator when the second radio wave enters the antenna, and the transmission signal to which the phase shift amount has been applied by the second phase conversion unit is radiated from the second antenna element as the first radio wave deflected in a direction of the antenna.

6. An antenna apparatus according to claim 3, wherein the external receiver controls an amplitude and a phase of each of a plurality of the reception signals output from the plurality of the RIS elements so that a noise component of a signal obtained by multiplexing the plurality of the reception signals becomes smaller than a predetermined value.

7. A communication apparatus comprising:

the antenna apparatus according to claim 3;

a transmitter configured to output a transmission signal; and the external receiver configured to receive a reception signal from the antenna apparatus.

8. A method for controlling an antenna apparatus comprising: a radiation unit configured to radiate a transmission signal as a first radio wave; a reflection unit configured to reflect the first radio wave; an antenna in which the first radio wave reflected by the reflection unit and a second radio wave received from outside enter; and an antenna control unit configured to control an operation of the antenna, the antenna comprising: a plurality of Reconfigurable Intelligent metaSurface (RIS) elements arranged in an array in which the first radio wave and the second radio wave enter; and a RIS element control unit configured to control operations of the plurality of RIS elements in accordance with the control by the antenna control unit, and each of the plurality of RIS elements comprising: an antenna element configured to receive the first radio wave and output the transmission signal, and receive the second radio wave and output a reception signal; a phase conversion unit configured to apply a predetermined phase shift amount to a signal to be input and then output the signal in accordance with the control by the RIS element control unit; and a switch configured to connect the antenna element to one of the phase conversion unit and external receiver in accordance with the control by the RIS element control unit, wherein in the method:

when the first radio wave enters the antenna, the antenna element is connected to the phase conversion unit by the switch of each of the plurality of RIS elements, and the transmission signal to which the predetermined phase shift amount has been applied by the phase conversion unit is radiated from the antenna element as a third radio wave;

the third radio wave radiated from each of the plurality of RIS elements is deflected in a predetermined direction in accordance with the phase shift amount applied to the transmission signal by each of the plurality of RIS elements;

when the second radio wave enters the antenna, the antenna element is connected to the external receiver by the switch of each of the plurality of RIS elements; and the reception signal is received by the external receiver.

* * * * *